(12) United States Patent
Qi et al.

(10) Patent No.: US 9,951,673 B2
(45) Date of Patent: Apr. 24, 2018

(54) ENGINE AFTERTREATMENT SYSTEM WITH EXHAUST LAMBDA CONTROL

(71) Applicants: Baohua Qi, Marietta, GA (US); Mi Yan, Marietta, GA (US)

(72) Inventors: Baohua Qi, Marietta, GA (US); Mi Yan, Marietta, GA (US)

( * ) Notice: Subject to any disclaimer, the term of this patent is extended or adjusted under 35 U.S.C. 154(b) by 0 days.

(21) Appl. No.: 15/042,784

(22) Filed: Feb. 12, 2016

(65) Prior Publication Data

US 2016/0160773 A1 Jun. 9, 2016

Related U.S. Application Data

(63) Continuation-in-part of application No. 13/364,531, filed on Feb. 2, 2012, now Pat. No. 9,291,079, which
(Continued)

(51) Int. Cl.
*F01N 3/00* (2006.01)
*F01N 3/02* (2006.01)
(Continued)

(52) U.S. Cl.
CPC .......... *F01N 11/007* (2013.01); *F01N 3/0234* (2013.01); *F01N 3/0253* (2013.01); *F01N 3/0864* (2013.01); *F01N 3/106* (2013.01); *F01N 3/206* (2013.01); *F01N 3/2013* (2013.01); *F01N 3/2033* (2013.01); *F01N 5/02* (2013.01); *F01N 9/002* (2013.01); *F01N 3/0842* (2013.01); *F01N 3/0871* (2013.01); *F01N 2240/02* (2013.01); *F01N 2240/16* (2013.01); *F01N 2240/30* (2013.01); *F01N 2250/02* (2013.01); *F01N 2550/02* (2013.01); *F01N 2560/025* (2013.01); *F01N 2560/026* (2013.01);
(Continued)

(58) Field of Classification Search
CPC ...... F01N 3/0253; F01N 3/103; F01N 3/2013; F01N 3/2033; F01N 3/206; F01N 5/02; F01N 9/002; F01N 2240/02; F01N 2240/30; F01N 2560/025; F01N 2560/06; F01N 2560/08; Y02T 10/16; Y02T 10/24; Y02T 10/26; Y02T 10/47
USPC .................................................. 60/280, 295
See application file for complete search history.

(56) References Cited

U.S. PATENT DOCUMENTS

| | | | |
|---|---|---|---|
| 7,926,263 B2 * | 4/2011 | Stroh | F01N 3/0814 60/274 |
| 2011/0173953 A1 * | 7/2011 | Neels | F01N 3/0253 60/274 |
| 2012/0216529 A1 * | 8/2012 | Joshi | F01N 3/0842 60/602 |

* cited by examiner

*Primary Examiner* — Patrick Maines
*Assistant Examiner* — Dapinder Singh

(57) ABSTRACT

An aftertreatment device for reducing NOx, PM, HC, and CO generated by a compression-ignition engine. In this device, lean exhaust air generated in the engine is enriched using a reactor together with an oxygen sorption device according to a target deNOx efficiency value, and heat energy is recovered. The enriched exhaust gas then passes through an oxidation catalyst, where NOx is reduced with CO and HC. PM in the exhaust gas is further trapped in a DPF. To lower energy cost, an heat exchanger is used for more effectively heating the DPF during regeneration, and an exhaust gas compressor positioned upstream from the DPF is employed to control engine back pressure. When exhaust gas temperature is low, to regenerate the DPF with minimum energy consumption, an electrical heater is used to heat dosing fuel before it is mixed with exhaust gas, and a regeneration heating process is then jump-started.

20 Claims, 18 Drawing Sheets

Related U.S. Application Data is a continuation-in-part of application No. 12/080,752, filed on Apr. 5, 2008, now abandoned.

(51) Int. Cl.
| | |
|---|---|
| *F01N 3/10* | (2006.01) |
| *F01N 3/20* | (2006.01) |
| *F01N 11/00* | (2006.01) |
| *F01N 3/023* | (2006.01) |
| *F01N 3/025* | (2006.01) |
| *F01N 3/08* | (2006.01) |
| *F01N 9/00* | (2006.01) |
| *F01N 5/02* | (2006.01) |

(52) U.S. Cl.
CPC ...... *F01N 2560/06* (2013.01); *F01N 2560/08* (2013.01); *F01N 2570/14* (2013.01); *F01N 2570/16* (2013.01); *F01N 2610/03* (2013.01); *F01N 2610/10* (2013.01); *F01N 2900/0408* (2013.01); *F01N 2900/0411* (2013.01); *F01N 2900/0416* (2013.01); *F01N 2900/0602* (2013.01); *F01N 2900/14* (2013.01); *F01N 2900/1402* (2013.01); *Y02T 10/16* (2013.01); *Y02T 10/26* (2013.01); *Y02T 10/47* (2013.01)

ENGINE AFTERTREATMENT SYSTEM WITH EXHAUST LAMBDA CONTROL

CROSS-REFERENCE TO RELATED APPLICATIONS

The present application is a continuation-in-part application of the co-pending U.S. patent application entitled Engine "Aftertreatment System with Exhaust Lambda Control" having Ser. No. 13/364,531, which was filed on Feb. 2, 2012, and which itself is a continuation-in-part application of the U.S. patent application entitled "Engine Aftertreatment System with Exhaust Lambda Control" having Ser. No. 12/080,752, which was filed on Apr. 5, 2008, and now abandoned, the entire contents of which are hereby incorporated by reference, and for which priority is claimed under 35. U.S.C. 120.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

FIELD OF THE INVENTION

The present invention relates to systems and methods for reducing exhaust emissions from internal combustion engines, more particularly, to apparatus and methods for reducing Nitrogen Oxides (NOx), Carbon Monoxide (CO), Hydrocarbon (HC), and Particulate Matter (PM) from compression ignition engines.

BACKGROUND OF THE INVENTION

Internal combustion engines are subject to emission regulations. In addition to improving in-cylinder designs, using Exhaust Gas Recirculation (EGR), and better controlling combustion, an aftertreatment device is normally needed for reducing pollutants, which include Nitrogen Oxides (NOx), Carbon Monoxide (CO), Hydrocarbon (HC), and Particulate Matter (PM), to required levels. In spark ignitions (SI) engines, fuel and air can be pre-mixed stoichiometrically, therefore, not much PM is seen in exhaust gas, while CO, HC, and NOx are major pollutants. However, in a compression ignition (CI) engine, due to heterogeneous fuel-air mixing and its lean combustion nature, PM and NOx are major components in its pollutants, while CO and HC are relatively insignificant.

In CI engines, in using EGR for adjusting peak combustion temperature, a tradeoff needs to be made between PM level and NOx emission. When both of PM and NOx need to be controlled, normally, two methods are used with an aftertreatment device. One is tuning NOx emission low, and using a high efficiency particulate filter, such as a diesel particulate filter (DPF), for removing PM. The other one is tuning PM level low, and using lean NOx removing technology, such as urea/ammonia Selective Catalytic Reduction (SCR), Lean NOx Trap (LNT)/NOx Absorber (NAC), and Lean NOx Catalyst (LNC), for controlling NOx emission. In the first method, normally the filter needs to be regenerated periodically. The regeneration can be achieved by heating up the filter to 500° C. to 600° C., and the heating energy is provided by burning fuel in an oxidation catalyst, such as a diesel oxidation catalyst (DOC) or a burner. Fuel penalty for filter regeneration depends on engine operating conditions and NOx emission level. When a low NOx emission level is required, e.g. according to US2010 HD standard, NOx emission is limited to 0.2 g/bhp·hour, fuel penalty could be a limiting factor for using the particulate filter method.

The other method needs to remove NOx from lean exhaust gas. As oxygen, NOx is also an oxidant. Therefore, a selective environment must be created more favorably for reactions reducing NOx, since oxygen concentration is much higher than that of NOx. Among all technologies used in reducing NOx in lean exhaust gas, SCR has the highest conversion efficiency, and thus is used broadly. However, in a selective catalyst, there exists a tradeoff between conversion efficiency and selectivity. A catalyst with high selectivity normally has poor conversion efficiency. As a result, to have high selectivity, a device with a large volume is needed when high conversion efficiency is required.

Though no hydrocarbon fuel is required in SCR technology, a urea solution needs to be mixed with exhaust gas. The urea solution is then evaporated and ammonia is generated through hydrolysis and thermolysis of urea. This ammonia generation process requires extra heat energy, and when the heat energy is provided by burning more fuel in engine, this fuel penalty could be more than 3% of total engine fuel consumption, depending on engine operating conditions and emission limits. Additionally, in reducing NOx, urea is consumed. The overall cost of urea consumption and fuel penalty in generating ammonia is comparable with the fuel penalty cost in a particulate filter system.

Different from that in CI engines, in SI engines, when air-fuel ratio is controlled at a stoichiometric level, NOx could have a higher or comparable concentration as oxygen. As a result, even in an oxidation catalyst without good selectivity, high deNOx efficiency could be obtained. This type of catalyst usually is called three-way catalyst, since in such a catalyst, CO and HC reduce NOx, and all three pollutants can be removed from exhaust.

Compared to a SI engine, a CI engine creates a lean exhaust gas due to its lean combustion nature, which causes difficulties in reducing NOx. When the lean exhaust gas becomes rich, an oxidation catalyst can be used to effectively reduce NOx. It is a goal of the present invention to provide a means for reducing NOx and other pollutants in lean exhaust gas by converting a lean exhaust gas to a rich exhaust gas without significantly sacrificing fuel economy. Furthermore, it is a goal of the present invention to provide an exhaust gas aftertreatment system without using a reducing agent other than hydrocarbon fuel.

BRIEF SUMMARY OF THE INVENTION

In the present invention, a new technology of reducing exhaust pollutants in a CI engine is developed. In this technology, oxygen is firstly removed and then an oxidation catalyst is used for reducing NOx, CO, and HC from exhaust gas.

Normally, due to its lean combustion nature, air-to-fuel ratio in a CI engine cannot be stoichiometric. In one embodiment of this invention, oxygen left in exhaust gas is removed by using a fuel reactor in which hydrocarbon fuel provided in in-cylinder late injection or injected with a dedicated doser reacts with oxygen, and the result rich exhaust gas then passes through an oxidation catalyst where NOx is reduced by HC and CO. The fuel reactor acts as an air-tofuel ratio controller, adjusting the lambda value of the exhaust gas to a target value at which NOx can be effectively reduced with CO and HC. The target lambda value is determined with a target deNOx efficiency according to an engine out NOx level, a target tailpipe NOx level, and a conversion curve of NOx, HC, and CO in the oxidation catalyst.

Compared to SI engines, CI engines have better fuel economy: usually CI engines are 30% or more efficient than SI engines. Therefore, it is uneconomic if the dosing fuel is just used for reducing pollutants from exhaust though comparatively there could also be around 6% fuel penalty or equivalent fuel penalty when using other types of aftertreatment devices such as LNT and SCR. To decrease fuel penalty, heat generated in exhaust lambda control is recovered with turbines and heat exchangers. Ideally, if the energy recovery efficiency is higher than engine efficiency, there will be no fuel penalty when using the fuel reactor.

In the embodiment, a DPF positioned downstream from the heat exchanger is used to further remove PM from exhaust gas. The DPF needs to be regenerated periodically to remove accumulated PM therein, and a high temperature exhaust gas is generated by dosing fuel in the oxidation catalyst in regenerating the DPF. Due to the limit of the light-off temperature, below which hydrocarbon fuel cannot be effectively oxidized in the oxidation catalyst, regenerating the DPF with low temperature exhaust gas is difficult. To solve this problem, an electrical heater is positioned downstream from an injector of a fuel doser, heating dosing fuel above the light-off temperature when exhaust gas temperature is low. To decrease energy cost, the electrical heater is positioned outside the exhaust flow heating only dosing fuel when it is energized. When exhaust gas temperature is high, to decrease the effects of the electrical heater to the atomization of the dosing fuel, either in-cylinder post injection, or a second injector can be used for providing dosing fuel.

The DPF and the heat exchanger create high pressure drop. To avoid the high pressure drop from affecting engine backpressure, an exhaust gas compressor is positioned upstream from the heat exchanger. The exhaust gas compressor generates a low pressure upstream therefrom, with which engine backpressure is controlled, and a high pressure downstream providing pressure drop across the heat exchanger and the DPF. A pressure sensor is positioned upstream from the exhaust gas compressor, and a closed-loop control can be used for lowering engine backpressure below a predetermined level.

To further lower energy cost in enriching the exhaust gas, oxygen in exhaust gas can be removed with an oxygen sorption device before or after the lambda control. Once the oxygen sorption device reaches a saturation level, a regeneration process is triggered, during which, oxygen adsorbed and/or absorbed in the device is desorbed for the next sorption process. A wheel structure and/or a valve-controlled structure can be used for continuously operating the device.

BRIEF DESCRIPTION OF THE DRAWINGS

FIG. 5b illustrates a schematic view of a soot filter system in an aftertreatment system of FIG. 5a;

DETAILED DESCRIPTION OF THE INVENTION

Figure 1:
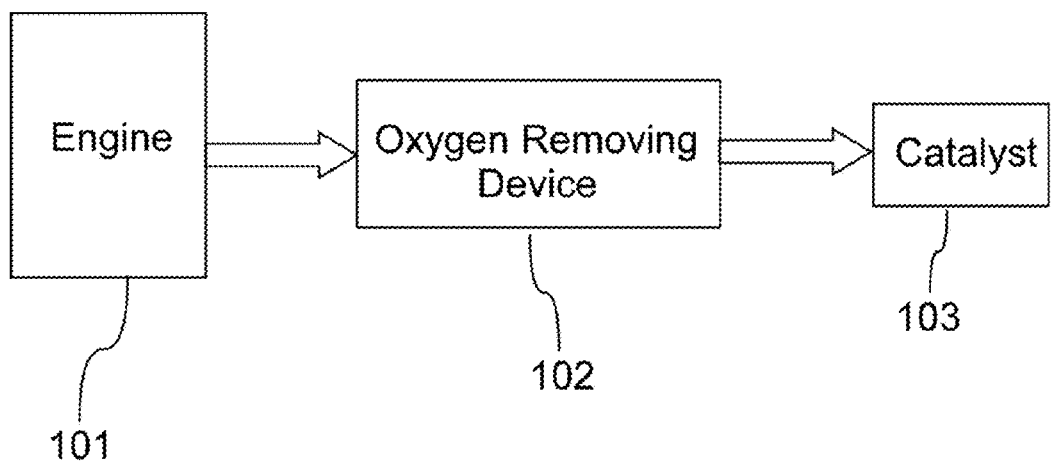
FIG. 1 is a block diagram of an aftertreatment system with an oxygen-removing device.

As depicted in FIG. 1, an engine system includes an engine 101, an oxygen-removing device 102 and an oxidation catalyst 103. The oxygen-removing device 102 is used for enriching exhaust gas produced from the engine 101. The result exhaust from the device 102 has a low oxygen concentration. In the oxidation catalyst 103, NOx in the rich exhaust is reduced by CO and HC, and thereby the pollutants are removed.

Figure 2A:
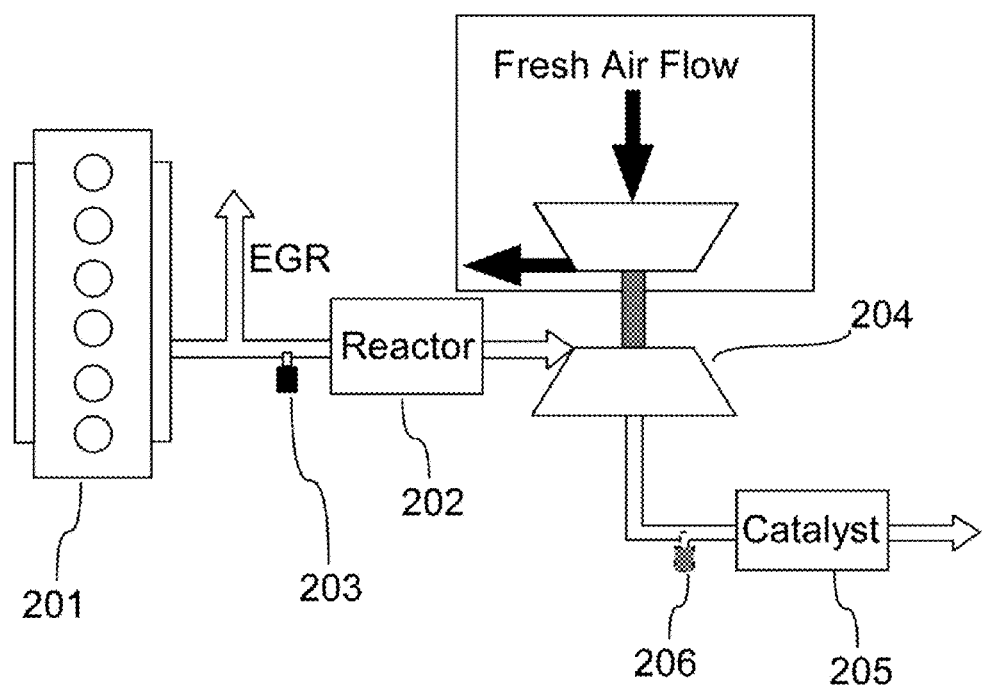
FIG. 2a shows a schematic diagram of an aftertreatment with a fuel reactor for exhaust lambda control and a turbine for recovering exhaust heat energy.

An embodiment of the oxygen-removing device is shown in FIG. 2a. A fraction of the exhaust gas produced from an engine 201 goes back to intake manifold trough an EGR system. The rest of the exhaust gas goes into a fuel reactor 202. Therein HC fuel provided in in-cylinder late injection or through a fuel doser 203 reacts with oxygen, and the exhaust gas is heated. The exhaust gas then passes through a turbo-charger including a turbine 204, where heat energy is partially recovered for compressing fresh air, and goes through a catalyst 205, where NOx reacts with CO and HC. The result exhaust air is emitted to ambient or goes to a soot filter (not shown in FIG. 2) for further removing PM. In the system, for better controlling the HC concentration in reducing NOx, or actively controlling the regeneration of the soot filter, an optional external doser 206 is installed in between the turbine 204 and the catalyst 205. In addition to compressing fresh air, when the turbo-charger is replaced with a turbo-generator, in which the turbine 204 is used to drive an alternator, the recovered energy can be converted to electric energy. The turbo-generator is especially useful in a hybrid vehicle.

The fuel reactor 202 can also be used for improving aftertreatment performance at cold-starts. In a cold-start, the turbo-charger cannot work effectively due to low exhaust pressure and temperature. As a result, large amount of PM could be generated. The reactor can be used for increasing exhaust gas temperature and pressure and thus improving the transient performance of the turbo-charger and burning PM in exhaust gas.

To effectively remove NOx, HC, and CO from exhaust gas with an oxidation catalyst, the lambda value (normalized air-to-fuel ratio) of exhaust gas needs to be controlled within a narrow window (Heywood, J. B., Internal Combustion Engine Fundamentals, McGraw-Hill, 1988, Page 654-657). Due to its lean combustion nature, normally in combustion control of CI engines, the lambda value is high, and an extra amount of fuel (dosing fuel) is needed to bring the lambda value down to a target value $\lambda_t$ in the window. According to the definition of the lambda factor, the fuel dosing rate can be calculated using the following equation:

$$m_{fuel} = \left(\frac{m_{fresh}}{AF_0}\right) * \left(\frac{1}{\lambda_t} - \frac{1}{\lambda_1}\right) \tag{1}$$

where $\lambda_1$ is the lambda value in the engine combustion control; $m_{fuel}$ is the mass flow rate of the dosing fuel in exhaust lambda control, and $AF_0$ is the stoichiometric air-to-fuel ratio.

Figure 2B:
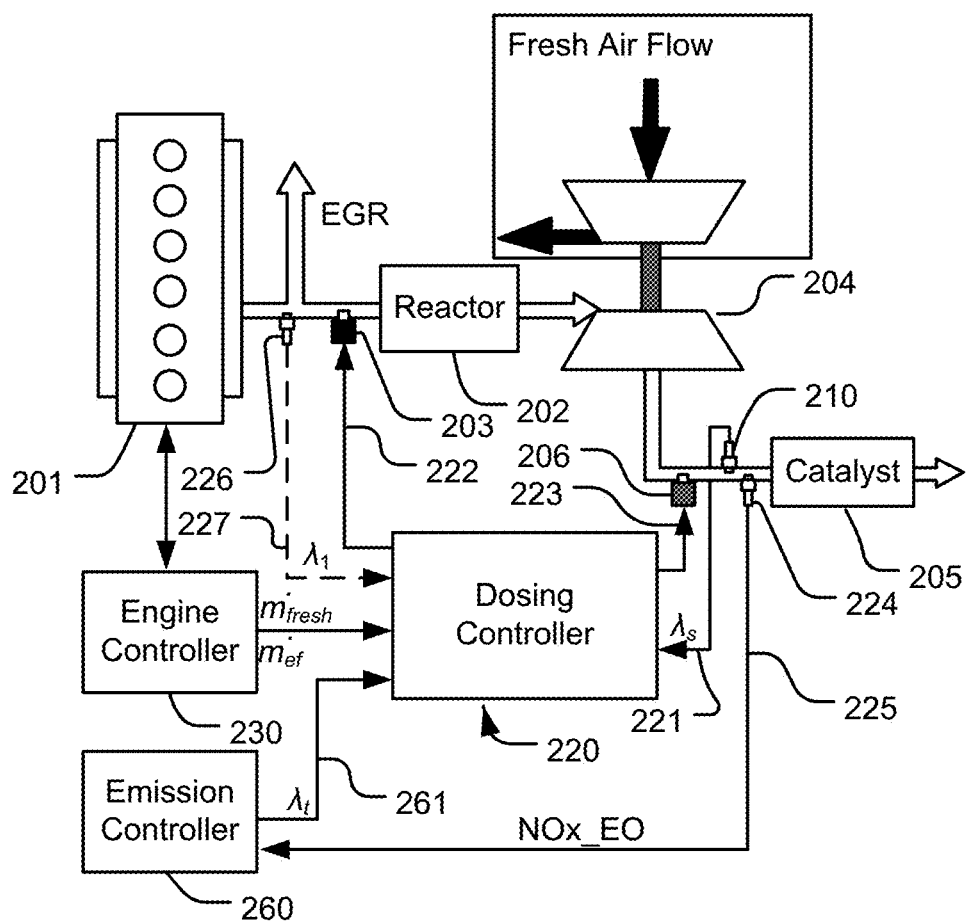
FIG. 2b shows a schematic diagram of an aftertreatment system of FIG. 2a with controllers.

For accurately controlling the exhaust gas lambda value, a feedback control can be used for a system with a lambda/oxygen sensor installed upstream from the catalyst 205, as shown in FIG. 2b. In such a system, through signal lines 221, a lambda/oxygen sensor 210 is electrically connected to a fuel dosing controller 220, which also controls dosers 203 and 206 through signal lines 222 and 223 respectively. The dosing controller generates dosing commands to the dosers 203 and 206 for controlling fuel delivering rates. And the exhaust gas lambda sensing value, $\lambda_s$, which is used in the feedback control, is monitored by using the lambda/oxygen sensor 210. The target lambda value, $\lambda_t$, and the lambda value in engine combustion control, $\lambda_1$, are also used in generating the dosing command. The $\lambda_t$ value is generated from an emission controller 260, through a signal line 261, while the $\lambda_1$ value can be obtained either using physical sensors, e.g. an optional lambda/oxygen sensor 226 communicating with the dosing controller 220 through signal lines 227, or calculated using engine fueling rate $m_{ef}^{\bullet}$ and fresh air flow rate $m_{fresh}^{\bullet}$, provided by an engine controller 230 with the following equation:

$$\lambda_1 = \frac{m_{fresh}}{m_{ef} AF_0}. \tag{2}$$

Figure 2C:
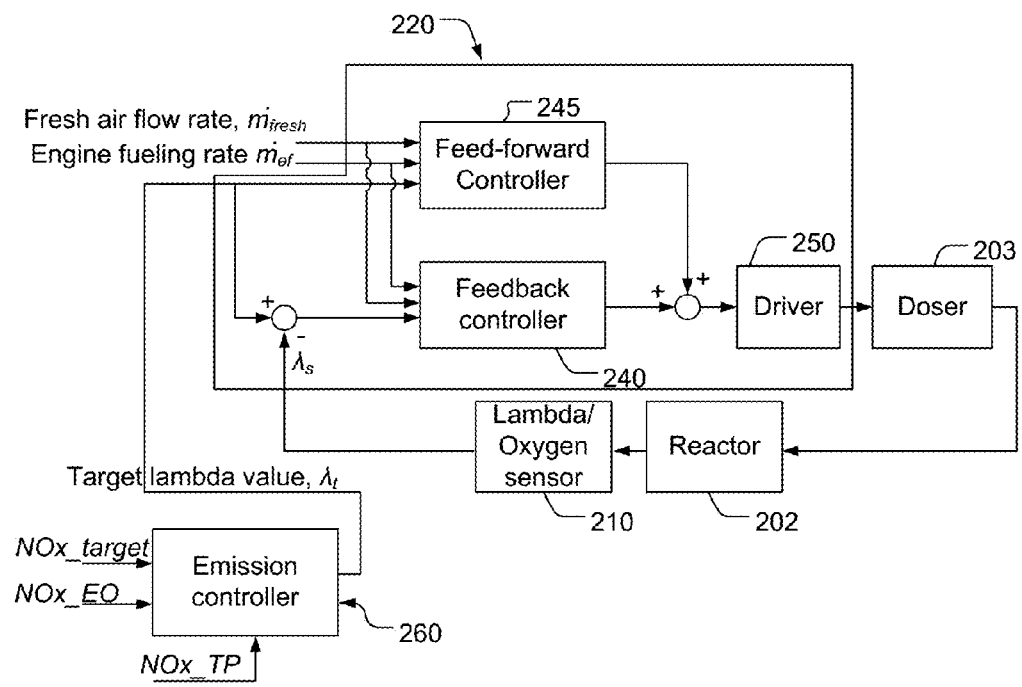
FIG. 2c is a block diagram of a control system for controlling an emission level in the aftertreatment system of FIG. 2b.

An exemplary feedback control scheme is shown in FIG. 2c. In this control scheme, the fueling rate $m_{ef}^{\bullet}$ together with the exhaust gas flow rate $m_{exh}^{\bullet}$ and the target lambda value $\lambda_t$ are used by a feed-forward controller 245 to calculate a baseline for the dosing rate to reach the target lambda value according to equations (1)-(2). The target lambda value $\lambda_t$ is also compared with the lambda sensing value $\lambda_s$ provided by the lambda/Oxygen sensor 210, and the error, $\lambda_t - \lambda_s$, is used by a feedback controller 240 to calculate a compensation value, which is added to the baseline value generated by the feed-forward controller 245. The sum value is then output to a driver 250 as a dosing command, and the driver 250 controls the doser 203 to generate the commanded dosing rate.

Figure 2D:
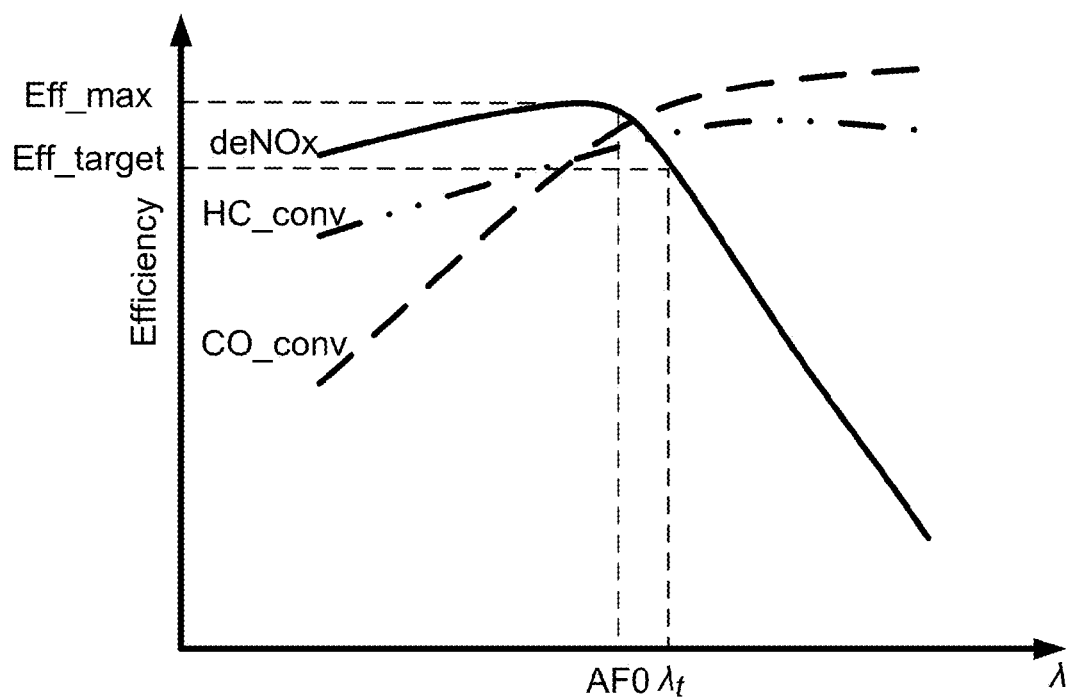
FIG. 2d shows a changing curve of conversion efficiencies of NOx, HC, and CO with air-to-fuel ratio values in an oxidation catalyst.

In the feed-forward controller, the $\lambda_t$ value is generated with a target NOx level value at tailpipe, NOx_target, and an engine out NOx value NOx_EO. The NOx_target value is an expected NOx level in tailpipe, which can be determined by engine operating parameters, such as engine speed and engine torque, while the NOx_EO value can be obtained from a NOx sensor, e.g. a NOx sensor 224 positioned upstream from the catalyst 205 communicating with the emission controller 260 through signal lines 225 (NOx sensor 224 can also be combined with the lambda sensor 210 providing both NOx sensing values and lambda sensing values), or calculated with engine operating parameters (FIG. 2b). Referring to FIG. 2d, in the catalyst 205, due to its oxidation catalyst nature, deNOx efficiency increases with the lambda value of the exhaust gas passing therethrough when the lambda value is low, and when the lambda value is higher than a certain value, which is close to the stoichiometric value AF0, the deNOx efficiency decreases with the lambda value. The HC conversion efficiency, HC_conv, and the CO conversion efficiency, CO_conv, also increase when the lambda value is low. However, these two efficiencies go flat rather than decrease when the lambda value is higher than AF0. With the NOx_target value and the NOx_EO value, a target efficiency value Eff_target is calculated with the following formula:

Eff_target=1−NOx_target/NOx_EO, (F1)

and the $\lambda_t$ value can be generated with the Eff_target value according to the relation shown in FIG. 2d. To avoid low conversion efficiencies of HC and CO, normally $\lambda_t$ is limited higher than the AF0 value, and the following formula can be used for calculating the $\lambda_t$ value:

$\lambda_t$=max(AF0,f(min(Eff_target,Eff_max))), (F2)

where Eff_max is the maximum achievable deNOx efficiency with acceptable conversion efficiencies of HC and CO, and f( ) is a function from the deNOx efficiency to the lambda values, which can be realized with a lookup table with an input of deNOx efficiency values.

In the feedback controller, a gain scheduling method can be used to adjust the dynamic performance according to the fresh air flow rate and the engine fueling rate. For example, when a PID controller is used, the Proportional, Integral, and Derivative gains of the controller can be functions of the fresh air flow rate and the engine fueling rate. Also, to decrease the overshoot caused by the feedback controller, the feedback controller can further be enabled or disabled by the error $\lambda_t - \lambda_s$, i.e., when the error is large, only the feed-forward controller provides the dosing rate command, and when the error is decreased below certain value, the feedback controller is enabled to correct the error together with the feed-forward controller.

Figure 2E:
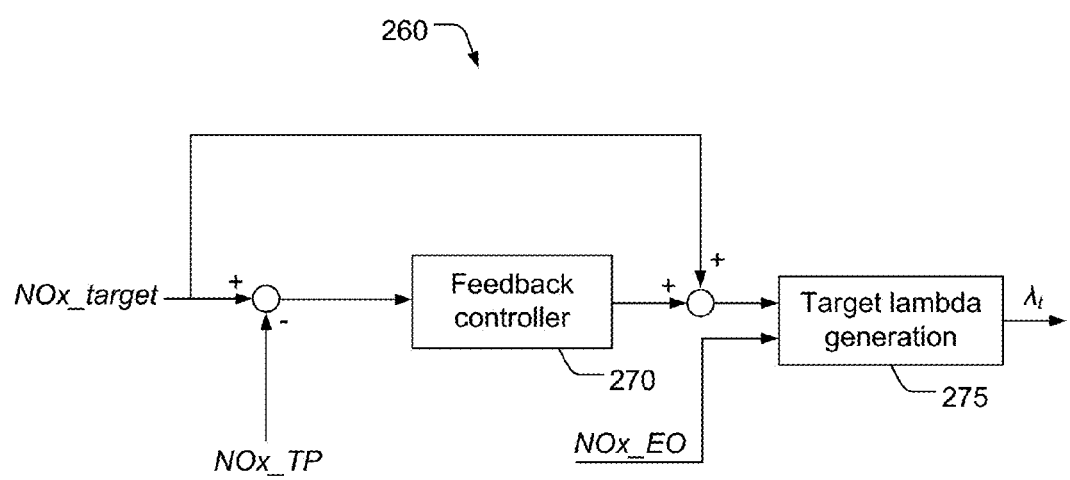
FIG. 2e shows a block diagram of closed-loop deNOx control.

In the system of FIG. 2b, a closed-loop deNOx control can also be implemented in the emission controller 260 with sensing values NOx_TP obtained from a tailpipe NOx sensor (not shown in FIG. 2b). As depicted in FIG. 2e, in this closed-loop deNOx control, the target NOx level at tailpipe, NOx_target, is compared with the tail pipe NOx sensing value NOx_TP, and the difference between these two values is used in a feedback controller block 270 for calculating a feedback compensation value. The sum of the compensation value and the NOx_target value is then used in a target lambda generation block 275 as a corrected target NOx level at tailpipe for calculating the $\lambda_t$ value together with the engine out NOx sensing value NOx_EO, and the same formulas F1 and F2 can be used in the calculation. In this closed-loop deNOx control, when the NOx_TP value goes high, through the block 270, a lower corrected target NOx level at tailpipe is calculated, and a lower $\lambda_t$ value is generated. Through the exhaust lambda control, higher deNOx efficiency then is obtained in the oxidation catalyst 205, and the NOx_TP value is lowered. The NOx_TP value increases with similar mechanism when it goes too low.

Referring back to FIG. 2a, as a byproduct of the exhaust gas lambda control, heat is released during the combustion of dosing fuel in the reactor 202 and exhaust gas temperature therein increases. If the overall temperature gained by the exhaust gas is $T_g$, then when the fuel dosing rate in exhaust lambda control is small compared to the exhaust mass flow, we have the following equation:

$$T_g = m_{fuel}^{\cdot} * LHV / (C_p * m_{exh}^{\cdot}) \quad (3)$$

where LHV is the low heating value of fuel; $C_p$ is the specific heat at constant pressure, and $m_{exh}^{\cdot}$ is the exhaust mass flow, $$m_{exh}^{\cdot} = m_{ef}^{\cdot} + m_{fuel}^{\cdot} + m_{fresh}^{\cdot}. \quad (4)$$

Based on equations (1), (3), and (4), the exhaust gas temperature gained across the reactor is $$T_g = \left(\frac{1}{\lambda_t} - \frac{1}{\lambda_1}\right) \frac{\lambda_t LHV}{C_p(\lambda_t AF_0 + 1)}. \quad (5)$$

According to the equation (5), with a given target lambda value $\lambda_t$, the temperature gained by the exhaust gas is determined by the lambda value $\lambda_1$ in engine combustion control. When the lambda value $\lambda_1$ is low, a high temperature exhaust gas flow can be generated. Consequently, in engine combustion control, the lambda value $\lambda_1$ needs to be carefully controlled, otherwise, a complex and expensive reactor and turbo capable of working at high temperatures are needed.

Figure 3:
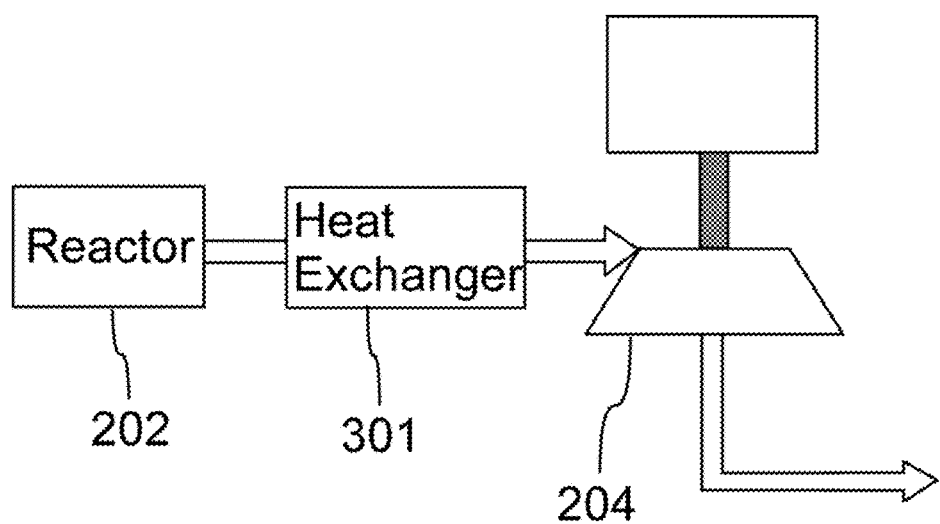
FIG. 3 shows a schematic diagram of an aftertreatment system including a heat exchanger.

In addition to tuning EGR fraction, a heat exchanger or multi-stage turbine can also be used for lowering the temperature at turbine inlet. As depicted in FIG. 3, a heat exchanger 301 positioned in between the fuel reactor 202 and the turbine 204 is used for decreasing the temperature of the exhaust gas passing through it. A heat pump (not shown in the figure) can be used with the heat exchanger for recovering the heat energy.

Figure 4:
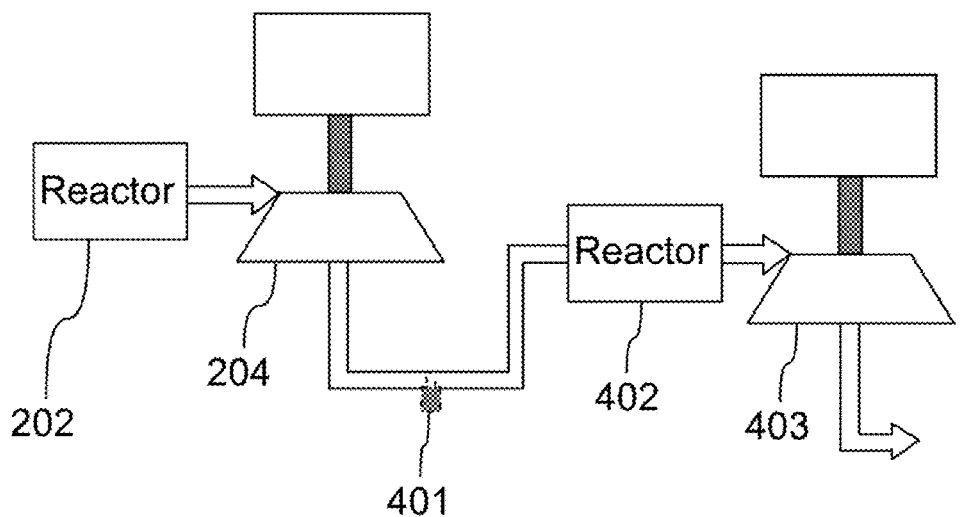
FIG. 4 depicts a schematic diagram of an aftertreatment with multiple fuel reactors and multiple turbines.

Another method for lowering the turbine inlet exhaust temperature is using multi-stage turbines. As shown in FIG. 4, a second stage turbine 403 is positioned downstream from the turbine 204. In between the turbine 403 and the turbine 204, a fuel reactor 402 is used for further controlling lambda value in the exhaust gas, and a doser 401 can be used for flexibly controlling the temperature of the exhaust gas passing through the turbine 403. Since the lambda value downstream from the turbine 403 is controlled by both of the reactors 202 and 402, the exhaust temperature upstream from the turbine 204 can be decreased by distributing the lambda control in between the reactors 202 and 402, i.e., the lambda value downstream from the reactor 202 can be controlled higher, resulting a lower exhaust gas temperature and then downstream from the reactor 202, and the fuel reactor 402 is used for further controlling the lambda value down to the target level. More turbines can be used for flexibly distributing heat generated in lambda control, if engine back pressure, cost and recover efficiency allow.

The exhaust gas with lambda controlled at the target level flows into an oxidation catalyst, where HC and CO in the exhaust react with NOx and generate $N_2$, $CO_2$, and $H_2O$. To further remove PM in the exhaust gas, referring to FIG. 5a, a soot filter system 502, which includes a DOC (Diesel Oxidation Catalyst) and a DPF (Diesel Particulate Filter), is installed in between the turbine 204 and an oxidation catalyst 503.

Normally the soot filter system 502 needs to be regenerated after an amount of PM deposited in the DPF exceeds a certain level. During regeneration, the exhaust lambda value at the inlet of the soot filter 502 cannot be controlled below 1.0, otherwise, soot in the filter is not able to be effectively removed, since oxygen in the exhaust is not enough for soot oxidation. To have an uninterrupted deNOx operation, a doser 501 can be used for further controlling lambda during filter regeneration, in which the fuel injected from the doser 501 reacts with the oxygen left in the regeneration in the front area of the catalyst 503 for lowering lambda to the target level.

Through turbines, heat energy is recovered into mechanical energy or electric energy. When the energy recovery efficiency is $\eta_r$, we can define the fuel penalty $r_p$ as the ratio of the net fuel loss in exhaust lambda control to the overall fueling amount, i.e.:

$$r_p = m_{fuel}^{\cdot} * \frac{\eta_e - \eta_r}{m_{fuel}^{\cdot} + m_{ef}^{\cdot}} \quad (6)$$

where $\eta_e$ is the engine energy efficiency. According to equations (1), (2) and (6), the fuel penalty can be calculated using the following equation:

$$r_p = \left(1 - \frac{\lambda_t}{\lambda_1}\right)(\eta_e - \eta_r) \quad (7)$$

The equation (7) shows that the fuel penalty is determined by the lambda value in engine combustion control and the difference between the energy recovery efficiency and the engine energy efficiency. As an example, if $\lambda_1 = 1.4$, and $\lambda_t = 1.0$, then to have a fuel penalty of 5%, which is normally the value of an DPF system, assuming engine energy efficiency is 40%, the required energy recovery efficiency will be 22.5%. If a turbine system has an energy recovery efficiency higher than 40%, there will be no fuel penalty.

Figure 5A:
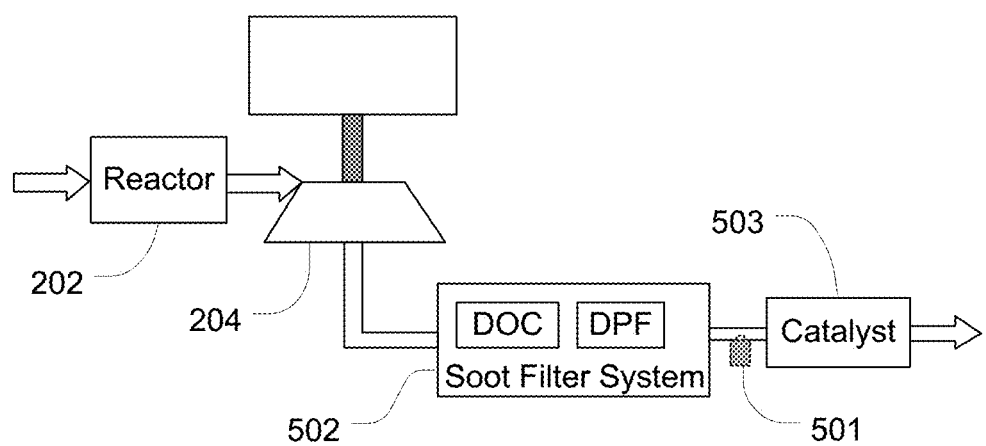
FIG. 5a is a schematic diagram of an aftertreatment system including a soot filter system.
Figure 5B:
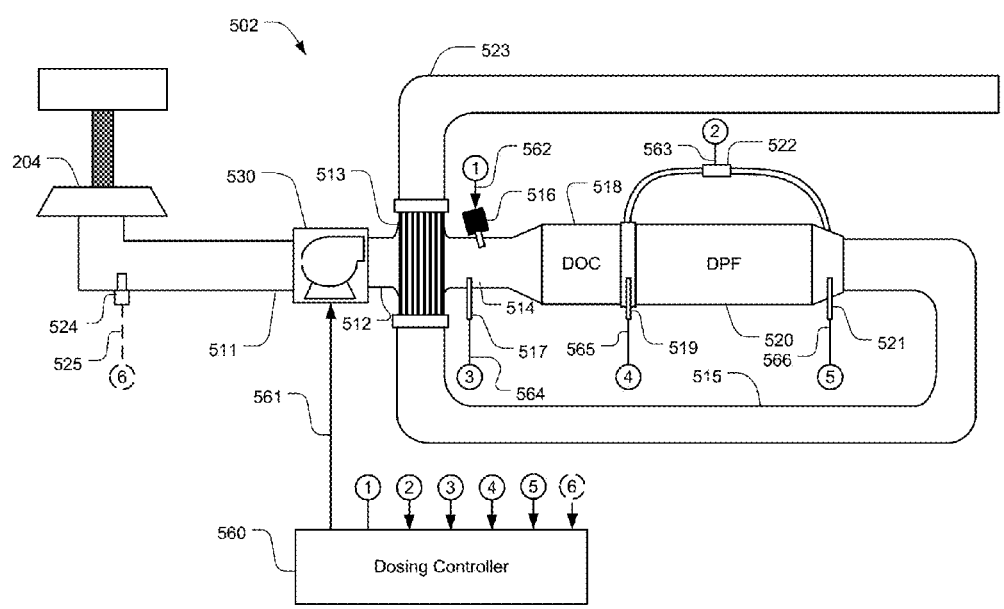

In the system of FIG. 5a, heat energy can also be recovered using a heat exchanger when regenerating the soot filter system 502. As depicted in FIG. 5b, in the soot filter system, an exhaust gas compressor 530, which is controlled by a dosing controller 560 through signal lines 561 has its inlet (low pressure side) fluidly connected to the outlet of the turbine 204 via a passage 511, and its outlet (high pressure side) fluidly connected to the shell inlet of a heat exchange device 513 through a passage 512. The shell outlet of the heat exchange device 513 is fluidly connected to a DOC 518 through a passage 514, on which a temperature sensor 517 is mounted and linked to the dosing controller via signal lines 564. A fuel doser 516, which is controlled by the dosing controller 560 through signal lines 562, is also installed on the passage 514 upstream from the temperature sensor 517 for delivering fuel to the exhaust gas flowing through the DOC 518. A DPF is positioned downstream from the DOC 518 for removing particulate matters in exhaust gas, and a differential pressure sensor 522 is used to measure a pressure drop across the DPF and report sensing values to the dosing controller 560 via signal lines 563. A temperature sensor 519, positioned in between the DOC 518 and the DPF 520 and connected the dosing controller 560 through signal lines 565, and another temperature sensor 521, positioned downstream the DPF 520 and connected to the dosing controller 560 through signal lines 566, are used to monitor the temperature at the inlet and the outlet of the DPF respectively. Exhaust gas passing through the DPF is introduced back to the tube inlet of the heat exchanger 513 through a passage 515, and the tube outlet of the heat exchanger 513 is fluidly connected to a passage 523 to release exhaust gas to the catalyst 503 (FIG. 5*a*).

In this system, PM deposited in the DPF 520 increases its restriction to exhaust gas flow, resulting in higher pressure drop across the DPF. When the restriction indicated by the pressure drop, which is measured using the differential pressure sensor 522, is higher than a threshold, a regeneration process is triggered. In the regeneration, after the light-off temperature of the DOC 518 is reached, hydrocarbon fuel is delivered by the doser 516 into a lean exhaust gas. In the DOC 518, the hydrocarbon fuel reacts with oxygen in the lean exhaust gas releasing heat energy, and the heated exhaust gas passes through the DPF 520, burning off the PM inside it. The exhaust gas then goes back to the heat exchanger 513 through the passage 515. Therein the exhaust gas in the tube loses heat energy to the exhaust gas in the shell and goes out into the catalyst 503 (FIG. 5*a*) through the passage 523.

During the regeneration process, the DOC inlet temperature and outlet temperature measured by using the temperature sensors 517 and 519 are used in determining the amount of dosing fuel needed to increase the exhaust gas temperature to a target value for effectively oxidizing the PM in the DPF 520, and the DPF outlet temperature measured by using the temperature sensor 521 is used for adjusting the fuel dosing rate to avoid overly heating the DPF 520. To decrease energy consumption, the heat exchanger 513 needs to have a high heat exchanging efficiency, and thus a long resident time of the exhaust gas in the heat exchanger, resulting in high pressure drop across the heat exchanger.

The pressure drop across the heat exchanger 513 and DPF 520 may cause a high backpressure to the engine, deteriorating fuel economy. To decrease the effects of the pressure drop, the exhaust gas compressor 530 is used for controlling the engine backpressure. When the gas compressor 530 is activated, a lower pressure is created upstream in the exhaust passage 511 with a high pressure downstream in the passage 512. The low pressure lowers engine backpressure, while the high pressure provides required pressure drop across the heat exchanger 513 and the DPF 520. The pressure increase created by the compressor 530 isolates the pressure drop from affecting the engine back pressure. And an optional pressure sensor 524 communicating to the dosing controller 560 through signal lines 525 can be further used for controlling the engine back pressure in closed-loop. With the pressure sensor 524, a simple pressure control can be implemented to activate the compressor 530 whenever the pressure sensing value obtained from the pressure sensor 524 is lower than a predetermined threshold. A more complex control, in which a feedback controller such as a PID controller is employed, can be further used to control the pressure upstream the compressor 530 at a certain level.

Figure 5C:
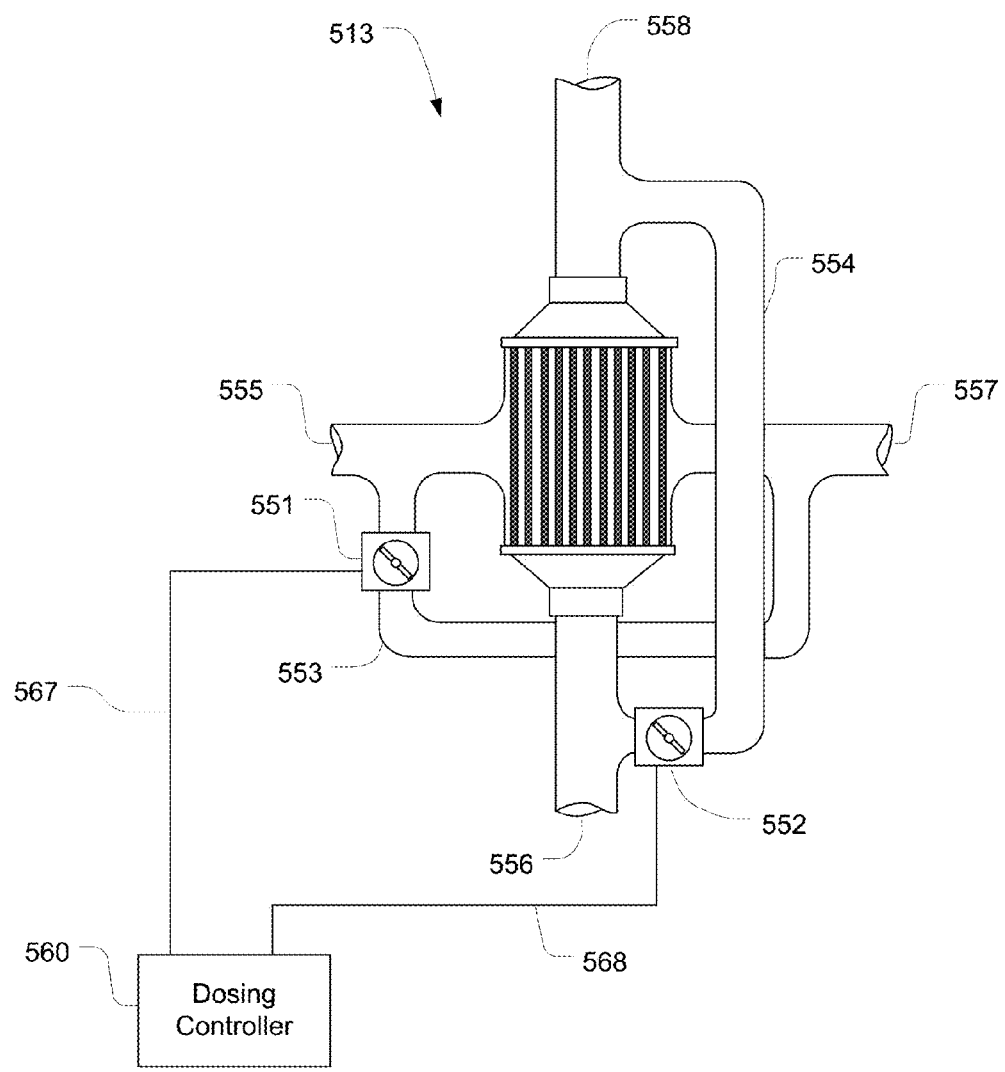
FIG. 5c shows a schematic view of a heat exchanging device in a soot filter system of FIG. 5b further including bypass valves.

To further lower energy cost, the heat exchanger 513 can also be bypassed in normal operations. In this way, exhaust gas only passes through the heat exchanger 513 during regeneration. Referring to FIG. 5*c*, in the exchange device 513, through a passage 553, the air flow in which is controlled by a valve 551, the shell inlet 555, which is fluidly connected to the high pressure outlet of the exhaust gas compressor 530 through a passage 512 (FIG. 5*b*), is fluidly coupled to the shell outlet 557, which is fluidly connected to the DOC 518 through a passage 514 (FIG. 5*b*). Similarly, the tube inlet 556, which is fluidly connected to the DPF 520 through a passage 515 (FIG. 5*b*), is fluidly coupled to the tube outlet 558, which is fluidly connected to the passage 523 (FIG. 5*b*), through a passage 554 and a control valve 552. The control valves 551 and 552 are controlled by the dosing controller 560 via signals lines 567 and 568 respectively. In normal operations, the valves 551 and 552 are open, since the restriction to exhaust gas flow in the passages 553 and 554 is lower than that in the shell and tube in the heat exchanger, the pressure drop is lowered. When a regeneration process is triggered, the valves 551 and 552 are closed, and the exhaust gas flows through the shell and tube in the heat exchanger with heat energy being transferred from the exhaust gas downstream from the DPF to that upstream from the DOC.

Figure 5D:
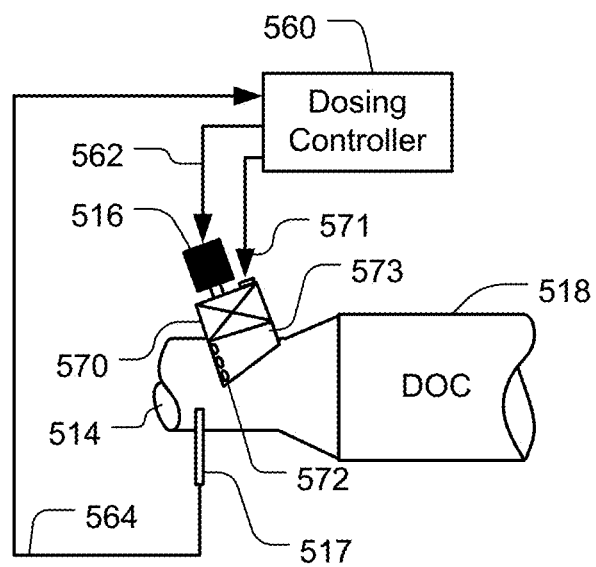
FIG. 5d shows a schematic view of a fuel doser in a soot filter system of FIG. 5b further including an electrical heater for heating dosing fuel.

In the soot filter system of FIG. 5*b*, to effectively oxidize fuel in the DOC, the exhaust gas temperature needs to be higher than the DOC light-off temperature, which is normally 200° C. to 250° C., otherwise, unburned fuel may slip through the DPF. The light-off temperature limit causes the system unable to start dosing with low temperature exhaust gas. To solve this problem, a positive feedback process can be introduced by momentarily heating the dosing fuel or the DOC to "jump-start" the heating process. When a dosing fuel heater is used, as shown in FIG. 5*d*, an electrical heater 570, controlled by the dosing controller 560 through signal lines 571, is used to heat the fuel released by the doser 516 to a temperature higher than the light-off temperature. In a mixer 573, the heated fuel is then mixed with exhaust gas, which enters the mixer 573 through bores 572. The heated fuel is partially oxidized in the exhaust gas in the mixer 573 and mixes with exhaust flow before entering the DOC 518, where it is fully oxidized, releasing more heat and warming up the exhaust gas and the DOC. Through the heat exchanger 513 (FIG. 5*b*), the released heat is transferred back to the exhaust gas entering the DOC 518, which is further warmed up with the dosing fuel being burned in exhaust gas with higher temperature. When the heat energy released in the DOC 518 equals to the heat loss to the exhaust gas, the DOC temperature is then able to be hold above the light-off temperature, and the electrical heating is turned off.

Figure 5E:
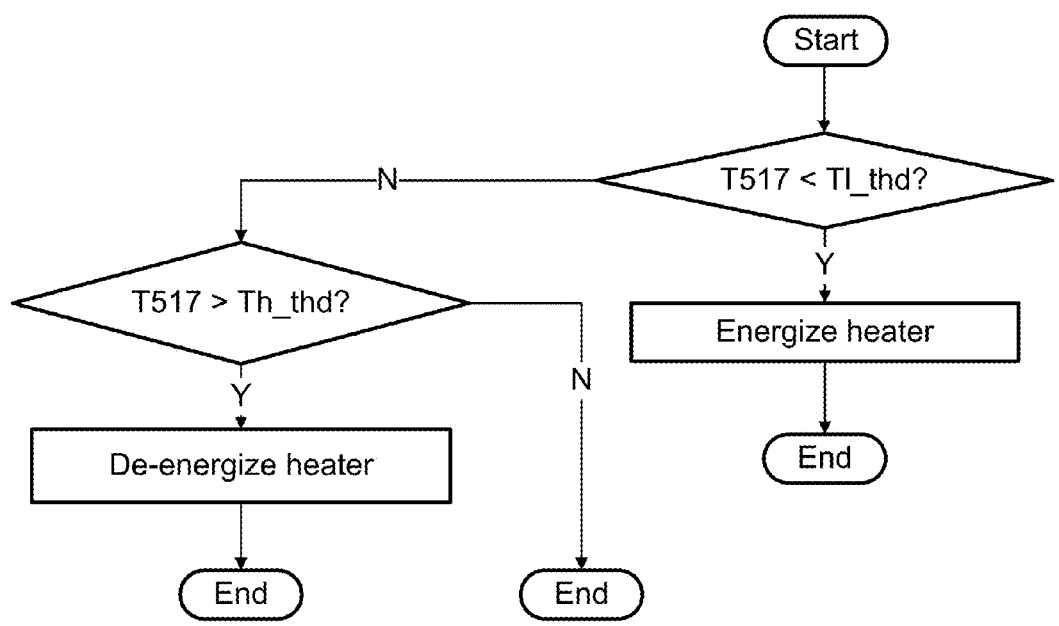
FIG. 5e is a flowchart of a service routine running periodically for a timer based interrupt for controlling an electrical heater in a fuel doser of FIG. 5d.

A service routine as shown in FIG. 5*e* running periodically for a timer based interrupt can be used in the dosing controller 560 for controlling the electrical heater 570. In this service routine, an exhaust temperature value T517 obtained from the temperature sensor 517 is compared to a threshold Tl_thd. If it is lower than the Tl_thd value, then the heater 570 is energized and the routine ends thereafter. Otherwise, the T517 value is compared to another threshold Th_thd. If it is higher than Th_thd, then the heater 570 is de-energized before the routine ends. The heater 570 keeps its controls status if the T517 value falls in between the Tl_thd and the Th_thd values. With this heating control, in jump-starting a heating process, the electrical heater 570 is only used for heating dosing fuel when exhaust temperature is low, rather than heating exhaust gas itself. And heat exchanging through the heat exchanger 513 speeds up the heating process. As a result, electrical energy for jump-starting the heating process is minimized.

Figure 5F:
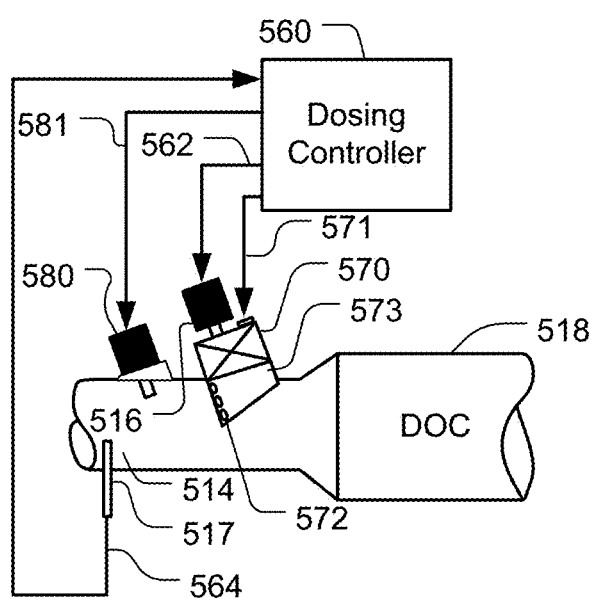
FIG. 5f shows a schematic view of a fuel doser of FIG. 5d including two fuel injectors.
Figure 5G:
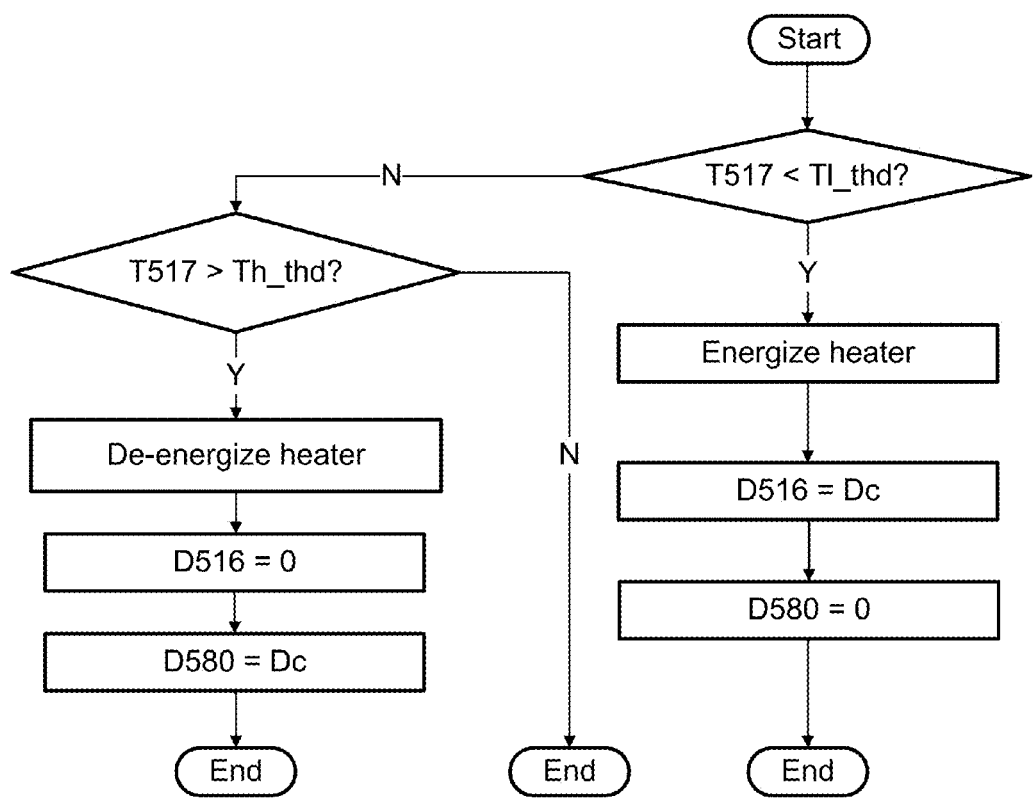
FIG. 5g shows a flowchart of a service routine running periodically for a timer based interrupt for controlling an electrical heater and fuel injectors in a fuel doser of FIG. 5f.

When exhaust gas temperature is higher than the light-off temperature of the DOC 518, the electrical heater 570 is de-energized, and the dosing fuel released through the fuel doser 516 can be oxidized in the DOC 518. In the apparatus of FIG. 5*d*, the electrical heater 570 is positioned downstream from the fuel doser 516, and the dosing fuel is sprayed on the electrical heater 570, through which it is heated. Normally, when the electrical heater 570 is energized, its temperature is higher than the boiling point of the dosing fuel, and the electrical heater 570 won't affect atomization of the dosing fuel. However, when the electrical heater 570 is de-energized, if it is positioned close to the nozzle in the fuel doser 516, it may be wetted by the dosing fuel, deteriorating atomization performance. To avoid fuel atomization issues, when exhaust gas temperature is high, fuel can be dosed either through in-cylinder late injection or with a second fuel doser as shown in FIG. 5*f*, in which a second fuel doser 580 controlled by the dosing controller 560 through signal lines 581 is positioned upstream from the fuel doser 516. With the second fuel doser 580, an algorithm realized by a service routine running periodically for a timer based interrupt can be used in the dosing controller 560 for controlling fuel dosing. Referring to FIG. 5*g*, in this service routine, similar to that of FIG. 5*e*, the electrical heater 570 is energized when the temperature T517 is lower than the threshold Tl_Thd. After the electrical heater 570 being energized, a fuel dosing command Dc is assigned to a variable D516, which is used for controlling the fuel dosing rate of the doser 516, and a zero value is assigned to a variable D580 controlling the fuel dosing rate of the doser 580. The electrical heater 570 is de-energized if the T517 value is higher than Th_thd. After the electrical heater 570 being de-energized, the variable D516 is set to 0 to disable fuel dosing through the doser 516, and the doser 580 is enabled by assigning the dosing rate command Dc to the variable D580. Both of the electrical 570 and the variables D580 and D516 keep their status when the temperature T517 falls in between the two thresholds of Tl_thd and Th_thd.

Figure 6:
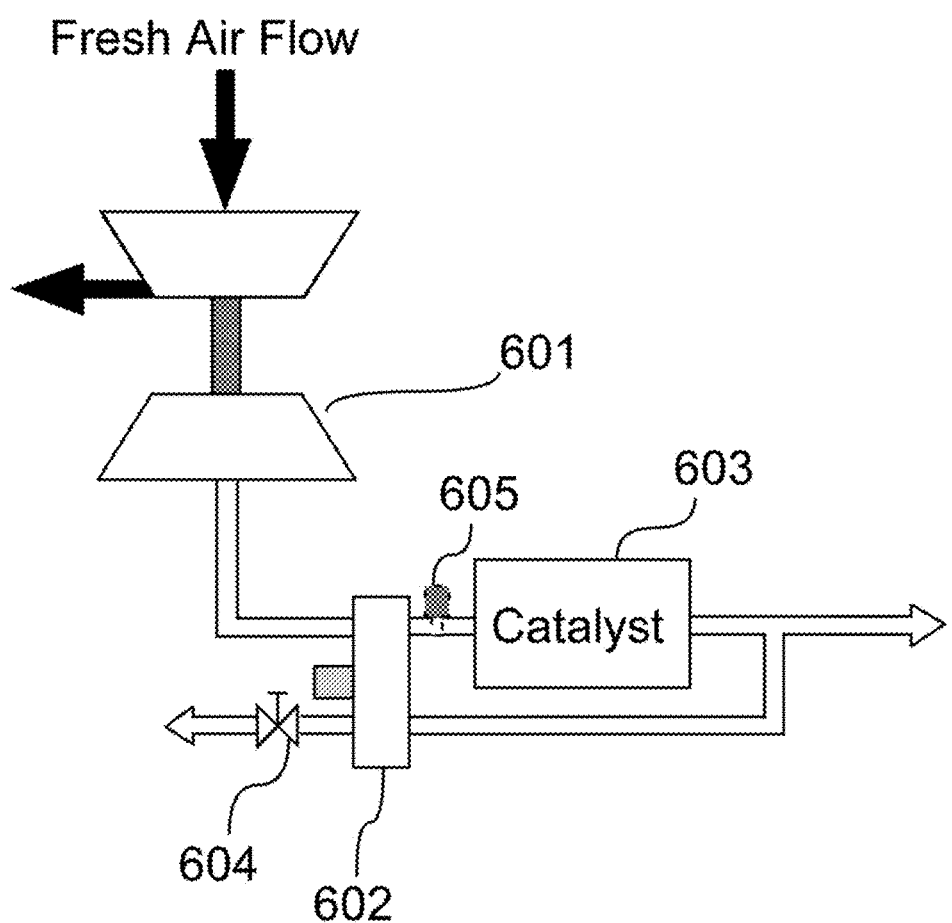
FIG. 6 illustrates a schematic diagram of an aftertreatment system with an oxygen sorption device.

Referring back to FIG. 1, in addition to a reactor with hydrocarbon fuel burned inside, oxygen sorption devices can also be used in the oxygen removing device 102. As shown in FIG. 6, in an exemplary system, an oxygen sorption device 602 is connected to a turbo-charger 601. Exhaust gas passes through the device 602, where oxygen is absorbed and/or adsorbed. The result exhaust gas then goes into a catalyst 603, therein NOx reacts with HC and CO and then is reduced. Hydrocarbon level in the exhaust can be controlled by using in-cylinder late injection, an upstream external doser such as the doser 203 in the apparatus of FIG. 2*a* (not shown in FIG. 6), or using an external doser 605. The clean rich exhaust processed by the catalyst 603 has a fraction flowing back to the oxygen sorption device 602 for device regeneration. To decrease the energy consumed in regeneration, a control valve 604 is used for controlling airflow.

Figure 7:
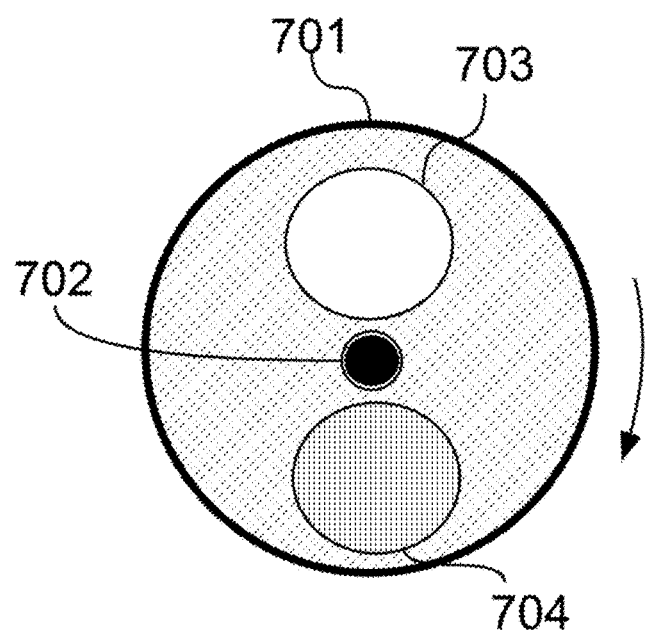
FIG. 7 shows a schematic view of an oxygen sorption device with a wheel structure.

The structure of an embodiment of the oxygen sorption device 602 is depicted in FIG. 7. This device includes a rotating apparatus 701 driven by an actuator 702, a working area 703 and a regeneration area 704 both having oxygen sorption materials. The working area 703 is in the exhaust stream absorbing and/or absorbing oxygen from exhaust gas, and thus the lambda is lowered. When the oxygen sorption material in the working area 703 reaches its saturation level, the actuator 702 is energized and drives the rotating apparatus 701 moving the working area 703 to the position of the regeneration area 704 and turning the regenerated area 704 into the exhaust stream for oxygen sorption. The oxygen sorption material in the regeneration area (previous working area) is then regenerated in the rich exhaust gas produced from the outlet of the catalyst 603 (the flow rate of the rich exhaust gas is controlled by the valve 604). The process repeats for continuously controlling oxygen level.

A variety of materials can be used for absorbing and/or adsorbing oxygen. Among them, perovskite-related oxides has a good oxygen sorption capacity at temperature range of 200° C. to 400° C., and can be regenerated at temperature at 600° C. [Kusaba, H., Sakai, G., Shimanoe, K., Miura, N., Yamazoe, N., Solid State Ionics, 152-153 (2002)689-694]. Extra energy is needed in regenerating the oxygen absorption material and in rotating the device. This part of energy contributes to the overall fuel penalty of the exhaust aftertreatment system.

Figure 8:
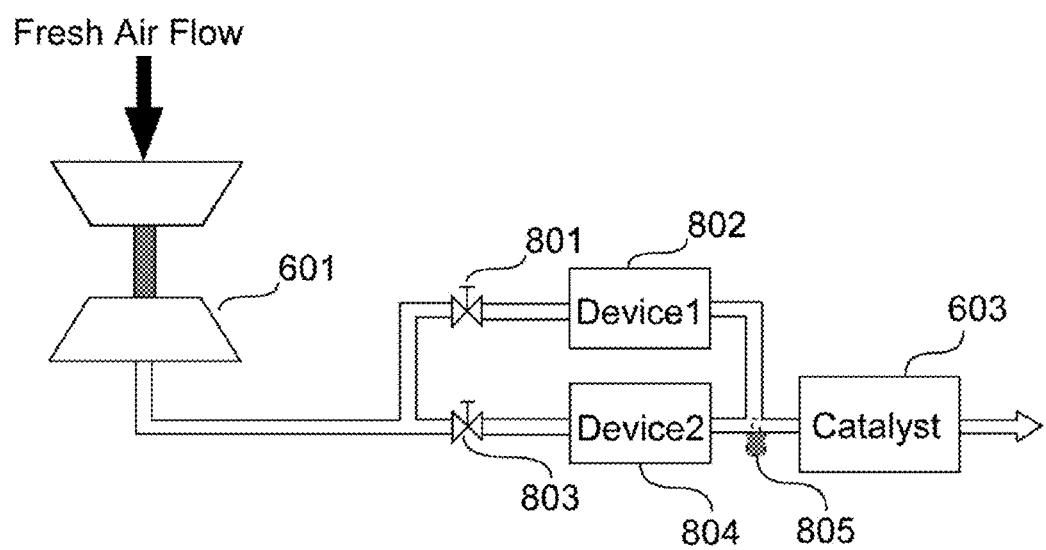
FIG. 8 shows a schematic diagram of an aftertreatment system with exhaust flow control valves.

In addition to the rotating device, a valve-controlled system can also be used for removing oxygen in exhaust gas. In such a system, as depicted in FIG. 8, two oxygen sorption devices: devices 802 and 804 are used together with two control valves 801 and 803 for oxygen level control. At beginning, the control valve 801 is off and the control valve 803 is on. Exhaust gas from the turbocharger 601 passes through the device 804 and has oxygen removed therein. The result exhaust gas then goes into the catalyst 603 and NOx is reduced by HC and CO. An HC doser 805, which in FIG. 8 is positioned in between the oxygen removing devices 802 and 804, and the catalyst 603, can be used for flexibly controlling the reactions. When the device 804 is saturated, the control valve 803 is shut off and the control valve 801 is turned on. The device 802 is then used for passing exhaust gas through and the device 804 is regenerated for next cycle. The two oxygen control devices work alternatively in continuous oxygen level control.

For better removing NOx, referring to FIG. 1, the catalyst 103 may include an LNT. In this system, when the lambda is not controlled at target level during some transient operations, the LNT then is able to remove NOx in exhaust gas. When lambda goes back to the target level, the LNT is regenerated by dosing with HC.

One skilled in the art will appreciate that the present invention can be practiced by other than the preferred embodiments which are presented in this description for purposes of illustration and not of limitation, and the present invention is limited only by the claims that follow. It is noted that equivalents for the particular embodiments discussed in this description may practice the invention as well.

The invention claimed is:

1. An emission control apparatus for an engine comprising:
    at least one combustion device configured to receive an exhaust gas flow produced from said engine and generate an enriched exhaust gas flow;
    at least one energy conversion device positioned downstream from said at least one combustion device for converting heat energy in said enriched exhaust gas flow into other forms of energy;
    an oxidation catalyst receiving said enriched exhaust gas flow produced by said at least one combustion device having NOx effectively reduced in an air-to-fuel ratio window with its lower bound lower than a stoichiometric air-to-fuel ratio and its upper bound higher than said stoichiometric air-to-fuel ratio;

an emission controller configured to determine a target NOx conversion efficiency value of said oxidation catalyst, and generate a target air-to-fuel ratio signal in response to said target NOx conversion efficiency value; and an air-to-fuel ratio controller configured to control a fuel delivering rate to said at least one combustion device to control an air-to-fuel ratio of said enriched exhaust gas flow in response to said target air-to-fuel ratio signal generated by said emission controller.

2. The emission control apparatus of claim 1, further comprising:
a NOx sensor positioned upstream from said oxidation catalyst generating a NOx sensing signal indicative of a NOx concentration in said enriched exhaust gas flow.

3. The emission control apparatus of claim 2, wherein said emission controller is further configured to determine said target NOx conversion efficiency value in response to said NOx sensing signal generated by said NOx sensor.

4. The emission control apparatus of claim 1, further comprising:
a feedback oxygen sensor positioned downstream from said at least one combustion device generating a first sensing signal indicative of said air-to-fuel ratio of said enriched exhaust gas flow.

5. The emission control apparatus of claim 4, wherein said air-to-fuel ratio controller is further configured to control said fuel delivering rate to said at least one combustion device in response to said first sensing signal generated by said feedback oxygen sensor.

6. The emission control apparatus of claim 5, further comprising:
a feed-forward oxygen sensor positioned in-between said engine and said at least one combustion device providing a second sensing signal indicative of an air-to-fuel ratio of said exhaust gas flow received by said at least one combustion device.

7. The emission control apparatus of claim 6, wherein said air-to-fuel ratio controller is further configured to control said fuel delivering rate to said at least one combustion device in response to said second sensing signal provided by said feed-forward oxygen sensor, and said first sensing signal generated by said feedback oxygen sensor.

8. The emission control apparatus of claim 1, further comprising:
at least one oxygen sorption device positioned upstream from said oxidation catalyst including oxygen sorption materials adsorbing or absorbing and desorbing oxygen.

9. The emission control apparatus of claim 8, wherein said oxygen sorption device includes at least two functional sections working sequentially in adsorbing or absorbing oxygen.

10. The emission control apparatus of claim 9, wherein said functional sections include at least a working section, which adsorbs or absorbs oxygen, and a regeneration section, which desorbs oxygen.

11. The emission control apparatus of claim 1, further comprising:
a Diesel Particulate Filter (DPF) positioned upstream from said oxidation catalyst for removing particulate matters produced from said engine;
a first heating device including a Diesel Oxidation Catalyst (DOC) positioned upstream from said DPF; and
a dosing device including a first injector positioned upstream from said DOC for delivering a hydrocarbon fuel.

12. The emission control apparatus of claim 11, further comprising:
a second heating device including a heating element positioned downstream from said first injector of said dosing device for heating said hydrocarbon fuel delivered by said dosing device above a light-off temperature of said DOC before said hydrocarbon fuel is mixed with said exhaust gas flow;
a temperature sensor generating a temperature sensing signal indicative of a temperature of said DOC;
a heating controller configured to control a first fuel delivering rate of said dosing device through said first injector in a process for regenerating said DPF; and
a pre-heating controller configured to generate a driving signal in said process for regenerating said DPF energizing said heating element of said second heating device when said temperature sensing signal indicates that said temperature of said DOC is lower than a first predetermined threshold, and de-energizing said heating element of said second heating device when said temperature sensing signal indicates that said temperature of said DOC is higher than a second predetermined threshold.

13. The emission control apparatus of claim 12, wherein said heating controller is further configured to stop fuel delivery through said first injector when said heating element is de-energized.

14. The emission control apparatus of claim 13, wherein said dosing device includes a second injector positioned upstream from said DOC.

15. The emission control apparatus of claim 14, wherein said heating controller is further configured to control a second fuel delivering rate of said dosing device through said second injector and stop fuel delivery through said second injector when said heating element is energized.

16. The emission control apparatus of claim 11, further comprising:
a heat exchanging device positioned upstream from said DOC including a first inlet configured to receive an exhaust gas flow, a second inlet fluidly coupled to an outlet of said DPF, a first outlet fluidly coupled to an inlet of said DOC, and a second outlet for releasing said exhaust gas flow received by said first inlet.

17. The emission control apparatus of claim 1, further comprising:
an exhaust gas compressor positioned upstream from said oxidation catalyst configured to lower a pressure upstream therefrom and create a high pressure downstream.

18. The emission control apparatus of claim 17, further comprising:
a Diesel Particulate Filter (DPF) positioned downstream from said air exhaust gas compressor for removing particulate matters;
a heat exchanging device positioned in between said exhaust gas compressor and said DPF including a first inlet configured to receive a compressed exhaust gas flow produced from said exhaust gas compressor, a second inlet fluidly coupled to an outlet of said DPF, a first outlet fluidly coupled to an inlet of said DPF, and a second outlet for releasing said compressed exhaust gas flow; and
a pressure controller configured to operate at least said exhaust gas compressor to control a back pressure of said engine below a predetermined limit value.

19. The emission control apparatus of claim 18, further comprising:

a pressure sensor positioned upstream from said exhaust gas compressor generating a pressure sensing signal indicative of a back pressure of said engine.

20. The emission control apparatus of claim 19, wherein said pressure controller is further configured to control said back pressure of said engine in response to said pressure sensing signal.

\* \* \* \* \*